US010101526B2

(12) United States Patent
Sasaki et al.

(10) Patent No.: US 10,101,526 B2
(45) Date of Patent: Oct. 16, 2018

(54) MULTICORE FIBER

(71) Applicants: FUJIKURA LTD., Tokyo (JP); NATIONAL UNIVERSITY CORPORATION HOKKAIDO UNIVERSITY, Hokkaido (JP)

(72) Inventors: Yusuke Sasaki, Sakura (JP); Katsuhiro Takenaga, Sakura (JP); Kunimasa Saitoh, Sapporo (JP)

(73) Assignees: FUJIKURA LTD., Tokyo (JP); NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 0 days.

(21) Appl. No.: 15/569,661

(22) PCT Filed: Apr. 26, 2016

(86) PCT No.: PCT/JP2016/063077
§ 371 (c)(1),
(2) Date: Oct. 26, 2017

(87) PCT Pub. No.: WO2016/175209
PCT Pub. Date: Nov. 3, 2016

(65) Prior Publication Data
US 2018/0120501 A1    May 3, 2018

(30) Foreign Application Priority Data
Apr. 30, 2015    (JP) .................................. 2015-093422

(51) Int. Cl.
*G02B 6/02*    (2006.01)
*G02B 6/44*    (2006.01)
*G02B 6/036*   (2006.01)

(52) U.S. Cl.
CPC .......... *G02B 6/02042* (2013.01); *G02B 6/02* (2013.01); *G02B 6/02023* (2013.01);
(Continued)

(58) Field of Classification Search
None
See application file for complete search history.

(56) References Cited

U.S. PATENT DOCUMENTS 5,394,499 A    2/1995    Ono et al.
5,608,835 A    3/1997    Ono et al.
(Continued)

FOREIGN PATENT DOCUMENTS

JP    H06-324223 A    11/1994
JP    H07-113920 A    5/1995
(Continued)

*Primary Examiner* — Chad H Smith
(74) *Attorney, Agent, or Firm* — Osha Liang LLP

(57) ABSTRACT

A multicore fiber communicates using light up to an xth-order LP mode (where x is an integer of 1 or more) in a communication band. The multicore fiber includes: a plurality of cores; a clad that surrounds the plurality of cores and has a refractive index lower than refractive indexes of the plurality of cores; and a cover layer that covers the clad and has a refractive index higher than the refractive index of the clad. Each of the plurality of cores propagates light up to an (x+1)th-order LP mode. A core pitch is set to a distance where crosstalk of the light up to the xth-order LP mode becomes less than or equal to −40 dB/km and crosstalk of light of the (x+1)th-order LP mode becomes greater than or equal to −30 dB/km.

4 Claims, 15 Drawing Sheets

(52) U.S. Cl.
CPC ......... *G02B 6/036* (2013.01); *G02B 6/03694* (2013.01); *G02B 6/44* (2013.01)

(56) References Cited

U.S. PATENT DOCUMENTS

| | | |
|---|---|---|
| 2001/0024558 A1 | 9/2001 | Dultz et al. |
| 2011/0182557 A1 | 7/2011 | Hayashi |
| 2013/0243384 A1 | 9/2013 | Matsuo et al. |
| 2013/0251320 A1* | 9/2013 | Hayashi ............. G02B 6/02042 385/100 |
| 2014/0010508 A1 | 1/2014 | Matsuo et al. |

FOREIGN PATENT DOCUMENTS

| | | |
|---|---|---|
| JP | H08-015535 A | 1/1996 |
| JP | 2002-523794 A | 7/2002 |
| JP | 2011-170336 A | 9/2011 |
| JP | 2011-215394 A | 10/2011 |
| JP | 2012-118495 A | 6/2012 |
| JP | 2014-010266 A | 1/2014 |
| JP | 2014-016472 A | 1/2014 |

* cited by examiner

MULTICORE FIBER

TECHNICAL FIELD

The present invention relates to a multicore fiber and is suitable for improving a degree of freedom for design.

BACKGROUND ART

Presently, an optical fiber used for an optical fiber communication system spreading generally has a structure in which outer circumference of one core is surrounded by a clad and an optical signal is propagated through the core, so that information is transmitted. Recently, an amount of information transmitted increases drastically with the spread of the optical fiber communication system. According to the increase in the amount of information transmitted, in the optical fiber communication system, a large number of optical fibers such as dozens or hundreds of optical fibers are used and large-capacity long-distance optical communication is performed.

It is known that, in the optical fiber communication system, a multicore fiber in which outer circumferences of a plurality of cores are surrounded by one clad is used and a plurality of signals are transmitted using light propagated through the individual cores.

An example of the multicore fiber is described in Patent Literature 1 described below. In the multicore fiber, one core is disposed on a center of a clad and six cores are disposed around the core disposed on the center. Because such an arrangement is a structure in which the cores can be disposed in a closest packing state, a large number of cores can be disposed with respect to an outer diameter of a specific clad. In addition, in the multicore fiber described in Patent Literature 1, propagation constants of light propagated through the cores adjacent to each other are different from each other to suppress crosstalk of light propagated through the individual cores.

However, there is a request for suppressing the crosstalk more than the case in which effective refractive indexes of the cores adjacent to each other are changed like the multicore fiber described in Patent Literature 1. Therefore, a multicore fiber in which a low refractive index layer having a refractive index lower than a refractive index of the clad is disposed to surround an outer circumferential surface of each core and the crosstalk is further prevented is known. This multicore fiber is described in Patent Literature 2 described below. When the multicore fiber is viewed from a viewpoint of the refractive index, the low refractive index layer has a shape of a trench. For this reason, the multicore fiber is called a trench type and a configuration from the core to the low refractive index layer is called a core element. Even in the trench type multicore fiber, propagation constants of light propagated through the cores adjacent to each other are different from each other to suppress the crosstalk of light propagated through the individual cores.
[Patent Literature 1] JP-A-2011-170336
[Patent Literature 2] JP-A-2012-118495

SUMMARY

However, it is necessary to change refractive indexes or diameters of the cores adjacent to each other to change the propagation constants of the light propagated through the cores adjacent to each other as described above. When communication is performed using light of a desired mode in a desired wavelength band, a range of obtained values of the refractive indexes or the diameters of the cores is narrow and there is a limitation in a degree of freedom for design to change the refractive indexes or the diameters of the cores adjacent to each other.

In addition, in the trench type multicore fiber, there is a tendency that it is hard to escape light of a higher-order mode in light propagated through a specific core or core element and a cutoff wavelength increases, when the core element is disposed to surround the specific core or core element. Therefore, to suppress propagation of light of a higher-order mode as compared with a mode of light propagated when the core element exists alone, a core pitch cannot be decreased greatly and there is a limitation in a degree of freedom for design.

Accordingly, one or more embodiments of the present invention provide a multicore fiber capable of improving a degree of freedom for design.

One or more embodiments of the present invention provide a multicore fiber for performing communication using light up to an xth-order LP mode (where x is an integer of 1 or more) in a communication band. The multicore fiber includes a plurality of cores; a clad that surrounds the plurality of cores and has a refractive index lower than refractive indexes of the plurality of cores; and a cover layer that covers the clad and has a refractive index higher than the refractive index of the clad. In addition, each of the plurality of cores propagates light up to an (x+1)th-order LP mode. A core pitch is set to a distance at which crosstalk of the light up to the xth-order LP mode becomes −40 dB/km or less and crosstalk of light of the (x+1)th-order LP mode becomes −30 dB/km or more. A distance between the core disposed on an outermost side in the clad and the cover layer is set to a distance at which an excessive loss of the light up to the xth-order LP mode, propagated through the core disposed on the outermost side, due to absorption into the cover layer becomes 0.001 dB/km or less and an excessive loss of the light of the (x+1)th-order LP mode, propagated through the core disposed on the outermost side, due to absorption into the cover layer becomes 3 dB/km or more.

According to the multicore fiber of one or more embodiments, because each core is a core propagating light of a higher-order mode by a 1 LP mode as compared with cores propagating only the light up to the xth-order LP mode, confinement of the light up to the xth-order LP mode in the core can be intensified. Therefore, as compared with a multicore fiber configured using the cores propagating only the light up to the xth-order LP mode, crosstalk of the light up to the xth-order mode can be suppressed. For this reason, a degree of freedom for designing a core interval and a degree of freedom for designing a refractive index or a diameter of each core are further improved as compared with the multicore fiber configured using the cores propagating the light up to the xth-order LP mode.

Meanwhile, an effective area of the light of the (x+1)th-order LP mode is larger than an effective area of the light up to the xth-order LP mode. By using this, the distance between the core disposed on the outermost side in the clad and the cover layer can be set such that the excessive loss of the light up to the xth-order LP mode, propagated through the core disposed on the outermost side, due to absorption into the cover layer becomes 0.001 dB/km or less and the excessive loss of the light of the (x+1)th-order LP mode, propagated through the core disposed on the outermost side, due to absorption into the cover layer becomes 3 dB/km or more. In the multicore fiber according to one or more embodiments the present invention in which the above setting is performed, the light of the (x+1)th-order LP mode that is propagated through the core located at the outermost side in the clad and is unnecessary for communication is absorbed into the cover layer and is lost. By using a fact that the effective area of the light up to the (x+1)th-order LP mode is larger than the effective area of the light of the xth-order LP mode, the core pitch is set to the distance at which the crosstalk of the light up to the xth-order LP mode becomes −40 dB/km or less and the crosstalk of the light of the (x+1)th-order LP mode becomes −30 dB/km or more. Therefore, the crosstalk of the light up to the xth-order LP mode used for the communication is suppressed and the crosstalk of the light of the (x+1)th-order LP mode to be light unnecessary for the communication occurs. As a result, the light of the (x+1)th-order mode can be moved to the core located at the outermost side in the clad by the crosstalk and is absorbed into the cover layer as described above. In this way, the crosstalk between the modes used for signal transmission can be improved by intensifying the confinement of the light up to the xth-order mode while propagation of the light of the (x+1)th-order mode unnecessary for the signal transmission is suppressed and a degree of freedom for designing the core interval and a degree of freedom for designing a refractive index or a diameter of the core can be improved.

In addition, the multicore fiber further includes an extension portion that extends such that diameters of the plurality of cores decrease, in a part of the plurality of cores in a longitudinal direction, and in the extension portion, the plurality of cores propagate the light up to the xth-order LP mode and propagation of the light of the (x+1)th-order LP mode is suppressed. In this case, in the extension portion, a loss of the light of the (x+1)th-order LP mode is 20 dB or more.

The extension portion is provided, so that the light of the (x+1)th-order LP mode unnecessary for the signal transmission can be caused to be further lost, and light of a mode unnecessary for communication can be eliminated more appropriately.

In addition, in one or more embodiments, x may be 1. According to the multicore fiber having the above configuration, a multicore fiber for single mode communication in which crosstalk is further improved as compared with a multicore fiber using only cores propagating only light of a basic mode in the related art can be achieved.

As such, according to one or more embodiments of the present invention, a multicore fiber capable of improving a degree of freedom for design is provided.

DETAILED DESCRIPTION

Figure 1:
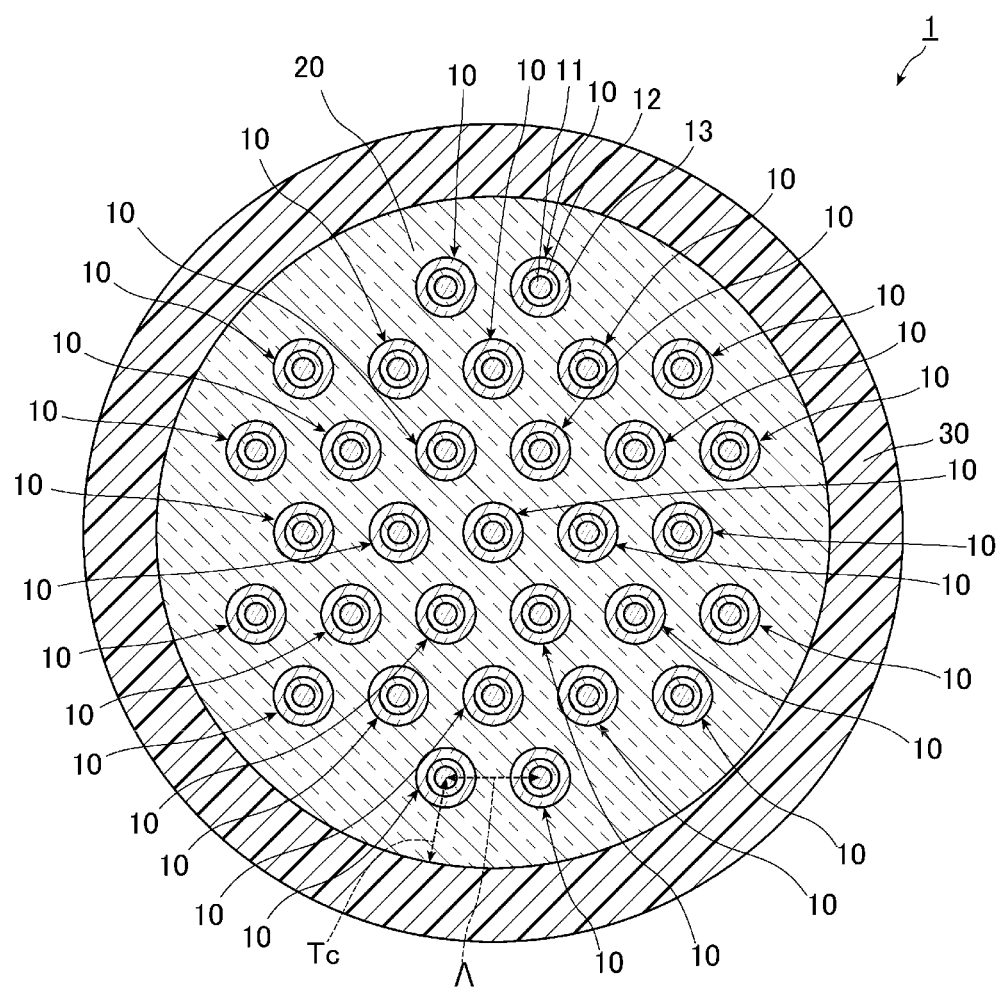
FIG. 1 is a cross-sectional view of a multicore fiber according to a first example of one or more embodiments of the present invention, vertical to a longitudinal direction.

Hereinafter, embodiments of a multicore fiber according to the present invention will be described in detail with reference to the drawings. To facilitate understanding, scales in the drawings and scales in the following description may be different from each other.

FIG. 1 is a diagram illustrating an aspect of a multicore fiber according to the first example of one or more embodiments of the present invention. As illustrated in FIG. 1, a multicore fiber 1 includes a plurality of core elements 10, a clad 20 that surrounds the individual core elements 10 without clearance, and a cover layer 30 that covers the clad 20.

One core element 10 is disposed as a core element of a first layer at a center of the clad 20. The plurality of core elements 10 are disposed as core elements of a second layer at an outer circumferential side of the core element 10 of the first layer, the plurality of core elements 10 are disposed as core elements of a third layer at outer circumferential sides of the core elements 10 of the second layer, and the plurality of core elements 10 are disposed as core elements of a fourth layer at outer circumferential sides of the core elements 10 of the third layer. As such, in the first example of one or more embodiments, the core elements are disposed by 1, 6, 12, and 12 in the four layers. A triangular lattice can be drawn by a line connecting centers of the core elements 10 adjacent to each other and each core element 10 is disposed on each lattice point of the triangular lattice. In this way, the plurality of core elements 10 are disposed in a closest packing state.

In addition, each of the core elements 10 has the same structure. Each of the core elements 10 has a core 11, an inner clad 12 which surrounds an outer circumferential surface of the core 11 without clearance, and a low refractive index layer 13 which surrounds an outer circumferential surface of the inner clad 12 without clearance and of which an outer circumferential surface is surrounded by the clad 20 without clearance.

Figure 2:
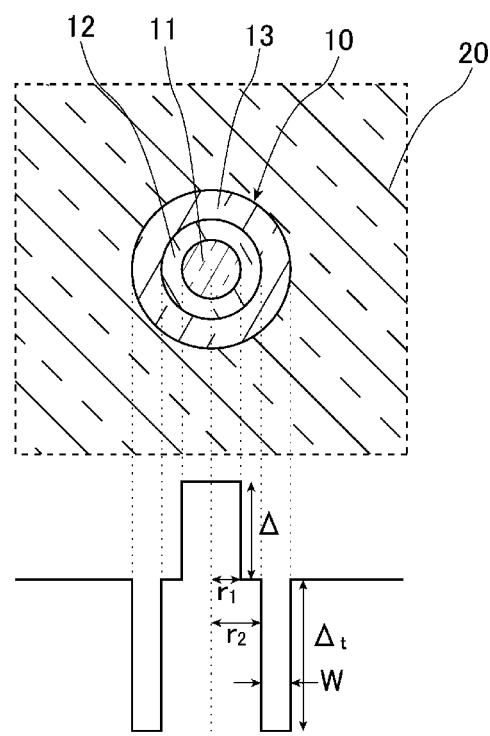
FIG. 2 is a diagram according to one or more embodiments illustrating a refractive index profile of core elements in the multicore fiber of FIG. 1.

FIG. 2 is a diagram according to one or more embodiments illustrating a refractive index profile of the individual core elements 10 of the multicore fiber 1 illustrated in FIG. 1. As illustrated in FIG. 2, a refractive index of the core 11 of the core element 10 is higher than a refractive index of the inner clad 12 and a refractive index of the low refractive index layer 13 is lower than the refractive index of the inner clad 12 and a refractive index of the clad 20. As such, when each core element 10 is viewed from a viewpoint of the refractive index, each low refractive index layer 13 has a groove shape and each core element 10 has a trench structure. By the trench structure, confinement of light propagated through each core 11 of the multicore fiber 1 can be intensified. In the first example of one or more embodiments, the refractive index of the inner clad 12 is the same refractive index as the refractive index of the clad 20.

Because each core element 10 of the multicore fiber 1 has the refractive index described above, the clad 20 and each inner clad 12 are made of quartz to which dopant is not added, each first core 11 is made of quartz to which dopant such as germanium to increase a refractive index is added, and the low refractive index layer 13 is made of quartz to which dopant such as fluorine to decrease a refractive index is added.

In addition, each core element 10 propagates light of an LP01 mode and light of an LP11 mode. In the light of the LP01 mode propagated through each core element 10, an effective area $A_{eff}$ at a wavelength of 1550 nm is almost equal to 80 $\mu m^2$, from a viewpoint of connectivity with a standard single mode fiber. Here, combinations of a relative refractive index difference $\Delta$ of the core 11 to the clad 20 when an effective area $A_{eff}$ of the light of the LP01 mode to be light of a wavelength of 1550 nm becomes 80 $\mu m^2$ and a radius $r_1$ of the core 11, in the case in which a relative refractive index difference $\Delta_t$ of the low refractive index layer 13 to the clad 20 is −0.7% and a ratio $r_2/r_1$ of the radius $r_1$ of the core 11 and a radius $r_2$ of the inner clad 12 is 1.7, are shown in Table 1.

In this case, the effective area $A_{eff}$ of the light of the LP11 mode propagated through the core 11 at the wavelength of 1550 nm is roughly 92 $\mu m^2$.

In addition, the refractive index of the cover layer 30 is higher than the refractive index of the clad 20. The cover layer 30 has a property of absorbing light and light reaching the cover layer 30 from the clad 20 is absorbed into the cover layer 30 and disappears. As an example of a material configuring the cover layer 30, an ultraviolet curing resin can be used.

Next, a relation of an excessive loss of the light, propagated through the core elements 10 disposed on the fourth layer to be outermost circumference, due to absorption into the cover layer 30 and a clad thickness will be described. As illustrated in FIG. 1, a clad thickness Tc means a distance from a center of the core 11 disposed on the outermost circumference to an outer circumferential surface of the clad 20. In the first example of one or more embodiments, even if any core element 10 disposed on the outermost circumference is used as a reference, the clad thickness Tc is constant.

Figure 3:
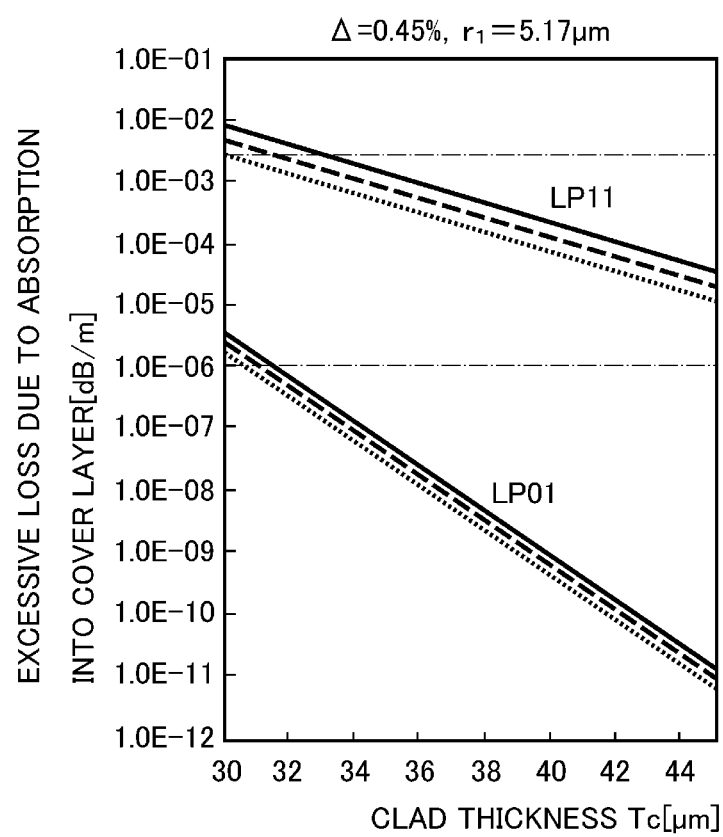
FIG. 3 is a diagram according to one or more embodiments illustrating a calculation result of a relation of a clad thickness and an excessive loss of light due to absorption into a cover layer, when a relative refractive index difference of a core to a clad is 0.45% and a radius of the core is 5.17 μm.
Figure 4:
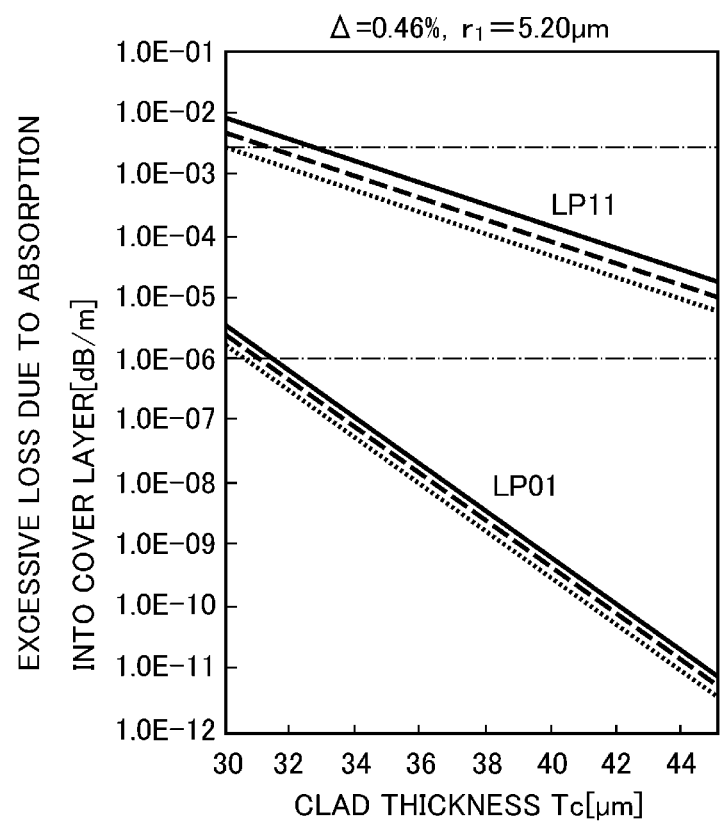
FIG. 4 is a diagram according to one or more embodiments illustrating a calculation result of a relation of a clad thickness and an excessive loss of light due to absorption into the cover layer, when a relative refractive index difference of the core to the clad is 0.46% and a radius of the core is 5.20 μm.
Figure 5:
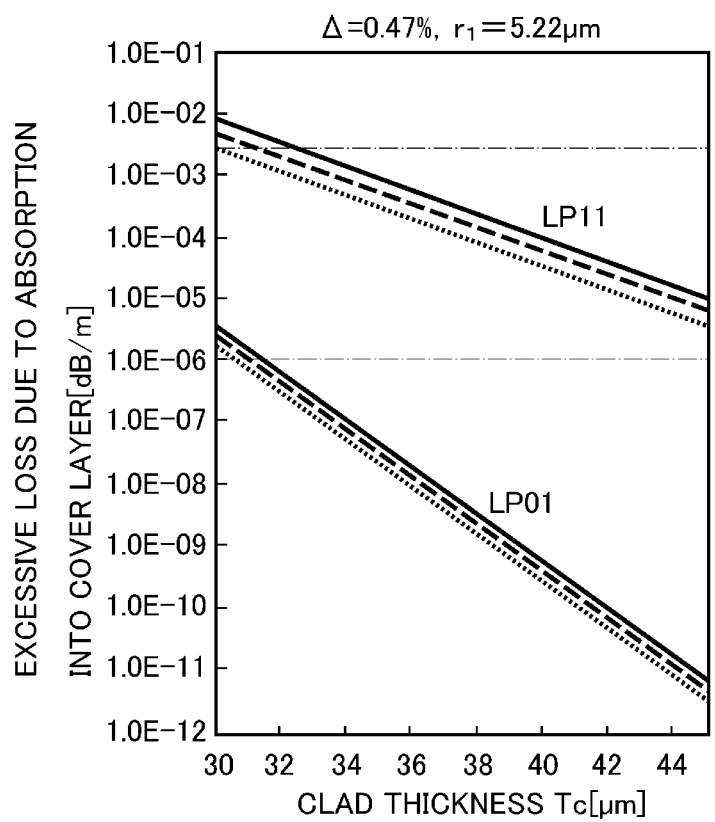
FIG. 5 is a diagram according to one or more embodiments illustrating a calculation result of a relation of a clad thickness and an excessive loss of light due to absorption into the cover layer, when a relative refractive index difference of the core to the clad is 0.47% and a radius of the core is 5.22 μm.

FIG. 3 is a diagram according to one or more embodiments illustrating a calculation result of a relation of the clad thickness Tc and an excessive loss of light due to absorption into the cover layer 30, in the case in which the relative refractive index difference $\Delta$ of the core 11 to the clad 20 is 0.45% and the radius $r_1$ of the core 11 is 5.17 $\mu m$, in Table 1. In FIG. 3, a solid line shows a state in which a ratio $W/r_1$ of the radius $r_1$ of the core 11 and a thickness W of the low refractive index layer 13 is 0.8, a broken line shows a state in which the ratio $W/r_1$ of the radius $r_1$ of the core 11 and the thickness W of the low refractive index layer 13 is 0.9, and a dotted line shows a state in which the ratio $W/r_1$ of the radius $r_1$ of the core 11 and the thickness W of the low refractive index layer 13 is 1.0. In addition, FIG. 4 is a diagram illustrating a calculation result of a relation of the clad thickness Tc and the excessive loss of light due to absorption into the cover layer 30, in the case in which the relative refractive index difference $\Delta$ of the core 11 to the clad 20 is 0.46% and the radius $r_1$ of the core 11 is 5.20 $\mu m$. In FIG. 4, a solid line shows a state in which the ratio $W/r_1$ of the radius $r_1$ of the core 11 and the thickness W of the low refractive index layer 13 is 0.7, a broken line shows a state in which the ratio $W/r_1$ of the radius $r_1$ of the core 11 and the thickness W of the low refractive index layer 13 is 0.8, and a dotted line shows a state in which the ratio $W/r_1$ of the radius $r_1$ of the core 11 and the thickness W of the low refractive index layer 13 is 0.9. In addition, FIG. 5 is a diagram illustrating a calculation result of a relation of the clad thickness Tc and the excessive loss of light due to absorption into the cover layer 30, in the case in which the relative refractive index difference $\Delta$ of the core 11 to the clad 20 is 0.47% and the radius $r_1$ of the core 11 is 5.22 $\mu m$. In FIG. 5, a solid line shows a state in which the ratio $W/r_1$ of the radius $r_1$ of the core 11 and the thickness W of the low refractive index layer 13 is 0.6, a broken line shows a state in which the ratio $W/r_1$ of the radius $r_1$ of the core 11 and the thickness W of the low refractive index layer 13 is 0.7, and a dotted line shows a state in which the ratio $W/r_1$ of the

TABLE 1

| $\Delta$ [%] | 0.4 | 0.41 | 0.42 | 0.43 | 0.44 | 0.45 | 0.46 | 0.47 | 0.48 | 0.49 | 0.5 |
|---|---|---|---|---|---|---|---|---|---|---|---|
| $r_1$ [$\mu m$] | 5 | 5.04 | 5.07 | 5.1 | 5.13 | 5.17 | 5.2 | 5.22 | 5.25 | 5.28 | 5.31 | radius $r_1$ of the core 11 and the thickness W of the low refractive index layer 13 is 0.8.

In calculations of FIGS. 3 to 5, the light of the LP01 mode is light in which a wavelength where an effective area $A_{eff}$ is largest is 1625 nm in a C band and an L band and the light of the LP11 mode is light in which a wavelength where an effective area $A_{eff}$ is smallest is 1530 nm in the C band and the L band. Generally, an optical fiber is not laid linearly and is bent and laid. Therefore, in the calculations of FIGS. 3 to 5, a bending radius of the multicore fiber is set to 140 mm.

As illustrated in FIGS. 3 to 5, it is seen that an excessive loss of the light of the LP01 mode due to absorption into the cover layer 30 becomes 0.001 dB/km or less in a region where the clad thickness Tc is roughly 31 μm. If it is considered that a propagation loss of the standard single mode fiber is 0.19 dB/km, a difference of 0.001 dB/km is a very small value. In addition, it is seen that an excessive loss of the light of the LP11 mode due to absorption into the cover layer 30 becomes 3 dB/km or more in a region where the clad thickness Tc is roughly 31 μm. If the excessive loss due to absorption into the cover layer 30 is 3 dB/km, the light is propagated through the multicore fiber 1 by 10 km, so that power can be set to $\frac{1}{1000}$ or less. Therefore, propagation of the light of the LP11 mode unnecessary for signal transmission can be suppressed.

In FIGS. 3 to 5, it is seen that there is an example in which the excessive loss of the light of the LP01 mode due to absorption into the cover layer 30 is 0.001 dB/km or less and the excessive loss of the light of the LP11 mode due to absorption into the cover layer 30 is 3 dB/km or more, in the region where the clad thickness Tc is roughly 31 μm. As such, in FIGS. 3 to 5, in the C band and the L band, a wavelength of the light of the LP01 mode shows an excessive loss due to absorption into the cover layer 30 at a wavelength where the effective area $A_{eff}$ is largest and a wavelength of the light of the LP11 mode shows an excessive loss due to absorption into the cover layer 30 at a wavelength where the effective area $A_{eff}$ is smallest. Therefore, there is a combination of the clad thickness Tc and the radius $r_1$ of the core 11 in which the light of the LP01 mode can be propagated at the excessive loss due to absorption into the small cover layer 30 not interfering with optical communication and the light of the LP11 mode can be sufficiently attenuated, when the light of the LP01 mode and the light of the LP11 mode are propagated in the same wavelength band.

Therefore, in the clad 20 of the multicore fiber 1 according to the first example of one or more embodiments, a distance between each core 11 disposed on the outermost side in the clad 20 and the cover layer 30 is set to a distance at which the excessive loss of the light of the LP01 mode (primary LP mode), propagated through the core 11 disposed on the outermost side, due to absorption into the cover layer 30, becomes 0.001 dB/km or less and the excessive loss of the light of the LP11 mode (secondary LP mode), propagated through the core 11 disposed on the outermost side, due to absorption into the cover layer 30, becomes 3 dB/km or more.

For this reason, in the multicore fiber 1 according to the first example of one or more embodiments, the light of the LP01 mode propagated through the core element 10 disposed on the outermost circumference is affected by the excessive loss due to absorption into the cover layer 30 not interfering with the optical communication and power of the light of the LP11 mode propagated through the core element 10 disposed on the outermost circumference is notably decreased by the excessive loss due to absorption into the cover layer 30.

Next, a relation of a core pitch and crosstalk will be described. The core pitch is an inter-center distance of the cores 11 adjacent to each other.

Figure 6:
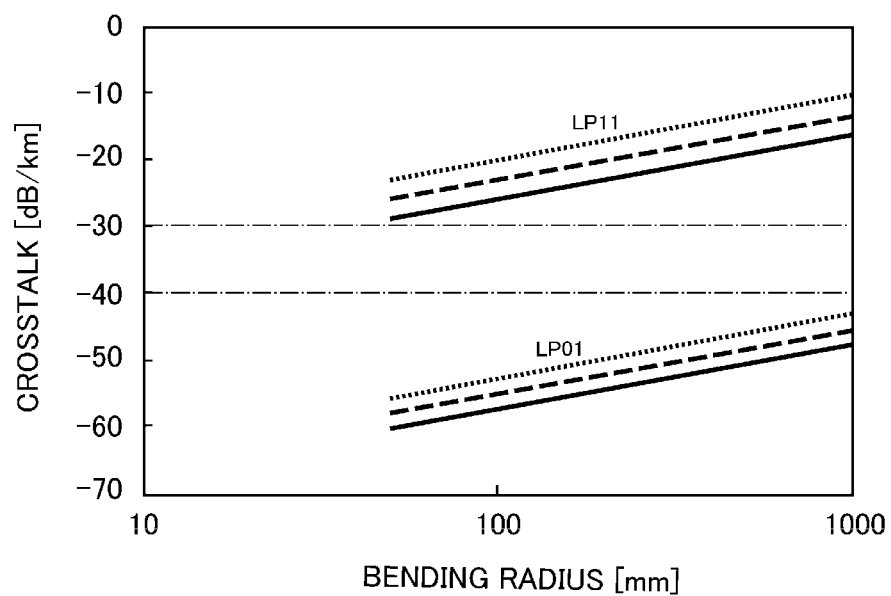
FIG. 6 is a diagram according to one or more embodiments illustrating a calculation result of a relation of a bending radius of the multicore fiber and crosstalk.

FIG. 6 is a diagram illustrating a calculation result of a relation of a bending radius of the multicore fiber 1 according to the first example of one or more embodiments and the crosstalk. In the multicore fiber 1 having the 31 core elements illustrated in FIG. 1, if a clad diameter is set to 230 μm and a clad thickness Tc is set to 31 μm, a core pitch Λ becomes 32 μm. In the calculation of FIG. 6, a core pitch Λ is set to 32 μm, wavelengths of the light of the LP01 mode and the light of the LP11 mode are set to the wavelengths used in the calculations of FIGS. 3 to 5, and a ratio $r_2/r_1$ of the radius $r_1$ of the core 11 and the radius $r_2$ of the inner clad 12 is set under the same conditions as the conditions of the case of Table 1. In FIG. 6, a solid line shows a result in which the relative refractive index difference Δ of the core 11 to the clad 20 and the radius of the core 11, used in the calculation of FIG. 3, are used and the ratio $W/r_1$ of the radius $r_1$ of the core 11 and the thickness W of the low refractive index layer 13 is calculated as 0.9. In addition, a broken line shows a result in which the relative refractive index difference Δ of the core 11 to the clad 20 and the radius of the core 11, used in the calculation of FIG. 4, are used and the ratio $W/r_1$ of the radius $r_1$ of the core 11 and the thickness W of the low refractive index layer 13 is calculated as 0.8. In addition, a dotted line shows a result in which the relative refractive index difference Δ of the core 11 to the clad 20 and the radius of the core 11, used in the calculation of FIG. 5, are used and the ratio $W/r_1$ of the radius $r_1$ of the core 11 and the thickness W of the low refractive index layer 13 is calculated as 0.7.

As illustrated in FIG. 6, a result in which the crosstalk of the light of the LP01 mode is smaller than −40 dB/km in all cases is obtained. In addition, a result in which the crosstalk of the light of the LP11 mode is larger than −30 dB/km in all cases is obtained. That is, in the case of the above conditions, if the core pitch is 32 μm, the crosstalk of the light of the LP01 mode can be set to −40 dB/km or less and the crosstalk of the light of the LP11 mode can be set to −30 dB/km or more. In FIG. 6, in the C band and the L band, the wavelength of the light of the LP01 mode is calculated as a wavelength where an effective area $A_{eff}$ is largest and the wavelength of the light of the LP11 mode is calculated as a wavelength where the effective area $A_{eff}$ is smallest. Therefore, there is the core pitch Λ where the crosstalk of the light of the LP01 mode can be set to a small value not interfering with the optical communication and the crosstalk of the light of the LP11 mode can be set to a large value, when the light of the LP01 mode and the light of the LP11 mode are propagated in the same wavelength band.

Therefore, the core pitch Λ of the multicore fiber 1 according to the first example of one or more embodiments is set to a distance at which the crosstalk of the light of the LP01 mode (primary LP mode) becomes −40 dB/km or less and the crosstalk of the light of the LP11 mode (secondary LP mode) becomes −30 dB/km or more.

For this reason, in the multicore fiber 1 according to the first example of one or more embodiments, the crosstalk of the light of the LP01 mode propagated through each core element 10 is suppressed. However, the light of the LP11 mode propagated through each core element 10 is moved by the crosstalk. Therefore, the light of the LP11 mode propagated through the first to third layers can be moved to the core element 10 of the fourth layer to be the outermost circumference by the crosstalk.

As described above, according to the multicore fiber 1 according to the first example of one or more embodiments, because each core element 10 is a core element propagating light of a higher-order mode by a 1 mode as compared with the core element propagating the light of only the LP01 mode (primary LP mode), confinement of the light of the LP01 mode in the core 11 can be intensified. Therefore, the crosstalk of the light of the LP01 mode can be suppressed as compared with the core propagating only the light of the LP01 mode. For this reason, a degree of freedom for designing the core pitch and a degree of freedom for designing a refractive index or a diameter of each core are improved as compared with the multicore fiber propagating only the light of the LP01 mode.

In addition, the distance between the core 11 disposed on the outermost side and the cover layer, that is, the clad thickness Tc is set to a magnitude at which the excessive loss of the light of the LP01 mode, propagated through the core 11 disposed on the outermost side, due to absorption into the cover layer 30, becomes 0.001 dB/km or less and the excessive loss of the light of the LP11 mode, propagated through the core 11 disposed on the outermost side, due to absorption into the cover layer 30, becomes 3 dB/km or more. Therefore, the light of the LP11 mode that is propagated through the core 11 located at the outermost side in the clad and is unnecessary for communication is absorbed into the cover layer 30 and is lost. In addition, the core pitch Λ is set to a distance at which the crosstalk of the light of the LP01 mode becomes −40 dB/km or less and the crosstalk of the light of the LP11 mode becomes −30 dB/km or more. Therefore, the crosstalk of the light of the LP01 mode used for the communication is suppressed and the crosstalk of the light of the LP11 mode to be light unnecessary for the communication occurs. As a result, the light of the LP11 mode can be moved to the core 11 disposed on the outermost side in the clad 20 by the crosstalk. In this way, the light of the LP11 mode propagated through the core 11 disposed on the inner circumferential side of the clad 20 is moved to the core 11 disposed on the outermost side of the clad 20 and is absorbed into the cover layer 30. Therefore, according to the multicore fiber 1 according to the first example of one or more embodiments, the crosstalk of the LP01 mode used for signal transmission can be improved while the propagation of the light of the LP11 mode not used for the signal transmission is suppressed.

Next, a second example of one or more embodiments of the present invention will be described in detail with reference to FIGS. 7 to 12. Components equal to or equivalent to those in the first example of one or more embodiments are denoted with the same reference numerals and overlapped description is omitted except for the case in which description is given particularly.

Figure 7:
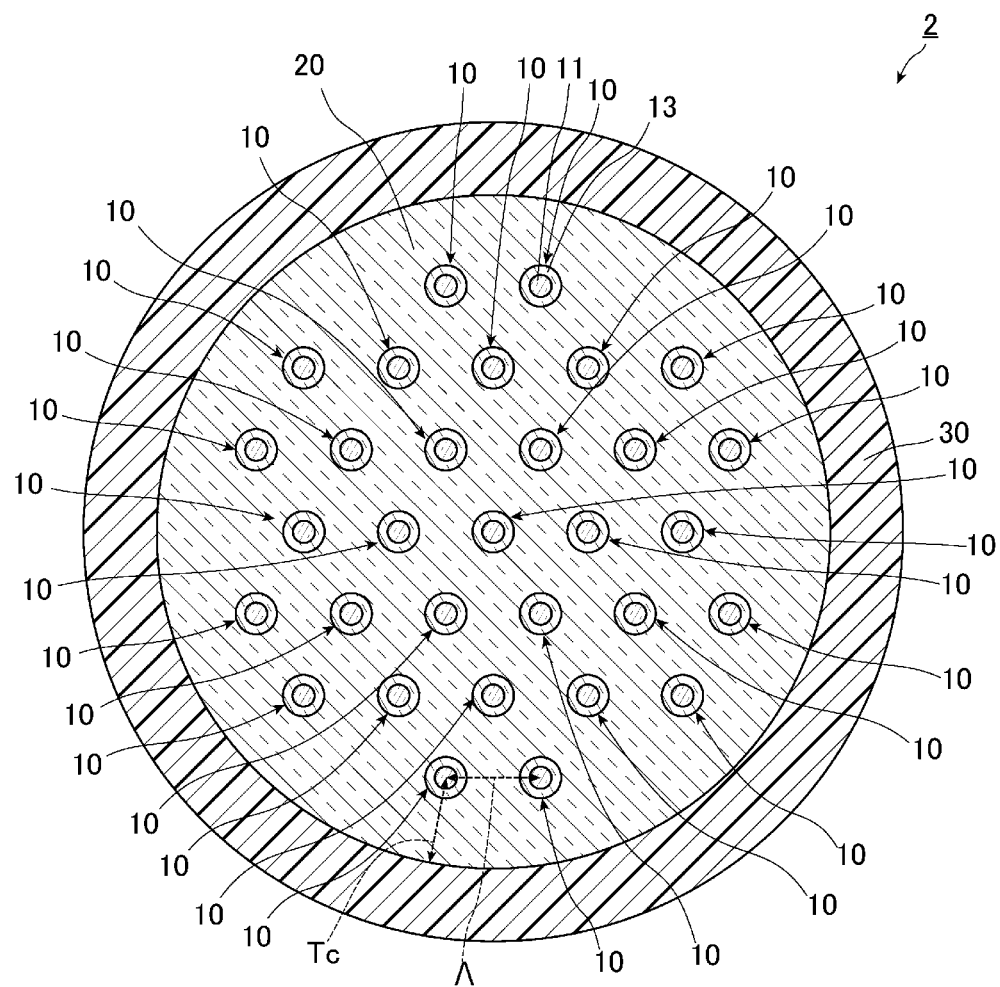
FIG. 7 is a cross-sectional view of a multicore fiber according to a second example of one or more embodiments of the present invention, vertical to a longitudinal direction.
Figure 8:
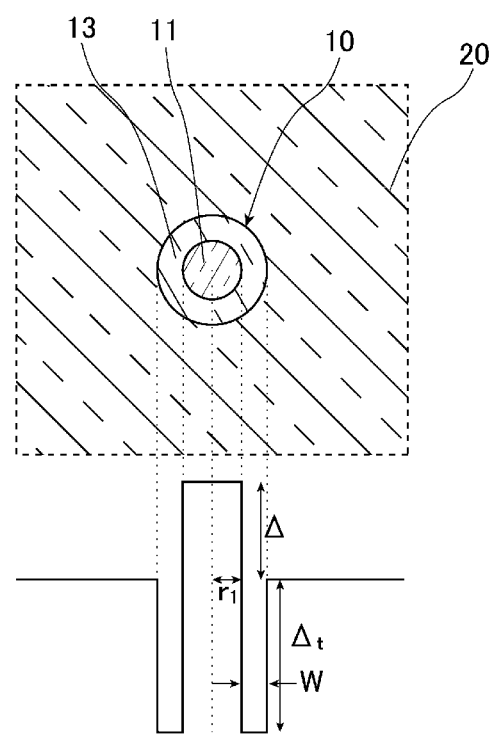
FIG. 8 is a diagram according to one or more embodiments illustrating a refractive index profile of core elements in the multicore fiber of FIG. 7.

FIG. 7 is a cross-sectional view of a multicore fiber according to one or more embodiments, vertical to a longitudinal direction, and FIG. 8 is a diagram illustrating a refractive index profile of core elements in a multicore fiber 2 of FIG. 7. As illustrated in FIGS. 7 and 8, the multicore fiber 2 according to the second example of one or more embodiments is different from the multicore fiber 1 according to the first example of one or more embodiments in that each core element 10 does not have an inner clad 12 and a core 11 is surrounded by a low refractive index layer 13 directly.

Even in the second example of one or more embodiments, each core element 10 propagates light of an LP01 mode and light of an LP11 mode. In addition, even in the second example of one or more embodiments, an effective area $A_{eff}$ of the light of the LP01 mode propagated through each core element is larger than 80 μm², from the same reason as the first example of one or more embodiments. Here, combinations of a relative refractive index difference Δ of the core 11 to a clad 20 when an effective area $A_{eff}$ of the light of the LP01 mode to be light of a wavelength of 1550 nm becomes 80 μm² and a radius $r_1$ of the core 11, in the case in which a relative refractive index difference $Δ_r$ of the low refractive index layer 13 to the clad 20 is −0.7%, are shown in Table 2.

TABLE 2

| Δ [%] | 0.4 | 0.41 | 0.42 | 0.43 | 0.44 | 0.45 | 0.46 | 0.47 | 0.48 | 0.49 | 0.5 |
|---|---|---|---|---|---|---|---|---|---|---|---|
| $r_1$ [μm] | 6.08 | 6.08 | 6.09 | 6.1 | 6.1 | 6.11 | 6.12 | 6.12 | 6.13 | 6.14 | 6.14 |

In this case, an effective area $A_{eff}$ of the light of the LP11 mode propagated through the core 11 is roughly 119 μm².

Next, a relation of an excessive loss of the light, propagated through the core elements 10 disposed on a fourth layer to be outermost circumference, due to absorption into a cover layer 30 and a clad thickness will be described in the same way as the first example of one or more embodiments.

Figure 9:
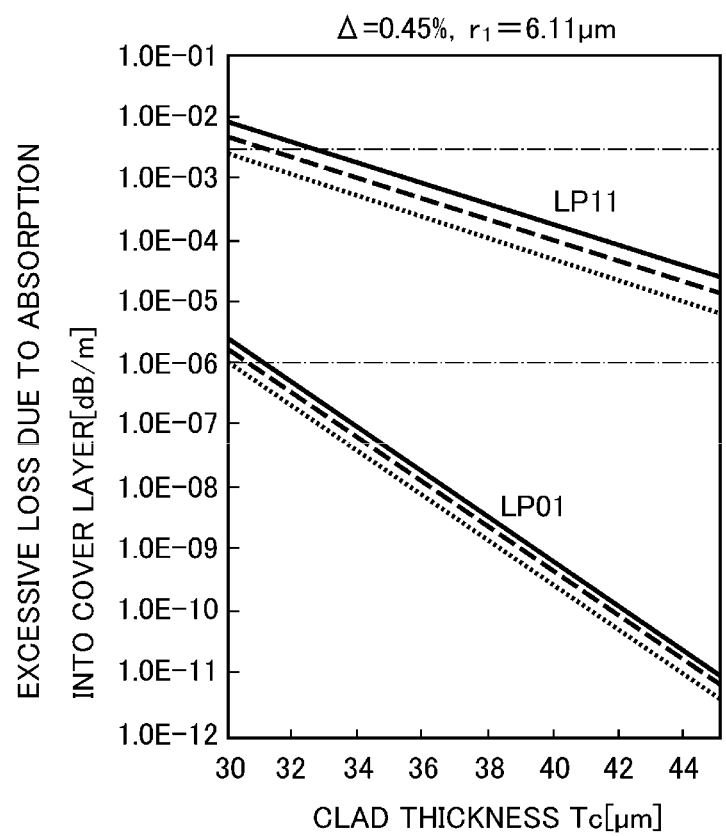
FIG. 9 is a diagram according to one or more embodiments illustrating a calculation result of a relation of a clad thickness and an excessive loss of light due to absorption into a cover layer, when a relative refractive index difference of a core to a clad is 0.45% and a radius of the core is 6.11 μm.
Figure 10:
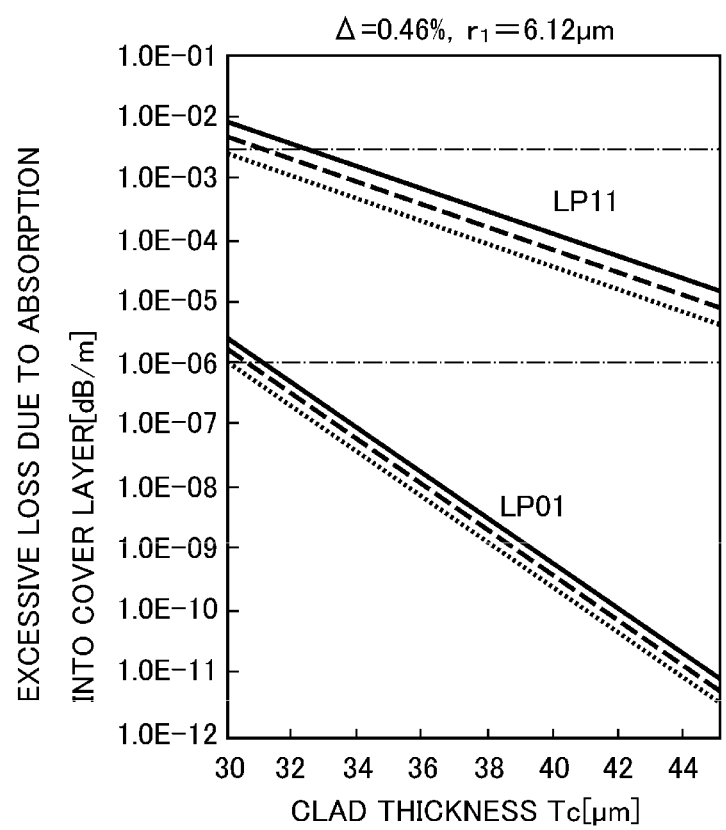
FIG. 10 is a diagram according to one or more embodiments illustrating a calculation result of a relation of a clad thickness and an excessive loss of light due to absorption into the cover layer, when a relative refractive index difference of the core to the clad is 0.46% and a radius of the core is 6.12 μm.

Similarly to FIG. 3, FIG. 9 is a diagram illustrating a calculation result of a relation of a clad thickness Tc and an excessive loss of light due to absorption into the cover layer 30, in the case in which a relative refractive index difference Δ of the core 11 to the clad 20 is 0.45% and a radius of the core 11 is 6.11 μm. Similarly to FIG. 4, FIG. 10 is a diagram illustrating a calculation result of a relation of the clad thickness Tc and the excessive loss of light due to absorption into the cover layer 30, in the case in which the relative refractive index difference Δ of the core 11 to the clad 20 is 0.46% and the radius $r_1$ of the core 11 is 6.12 μm. Similarly to FIG. 5, FIG. 11 is a diagram illustrating a calculation result of a relation of the clad thickness Tc and the excessive loss of light due to absorption into the cover layer 30, in the case in which the relative refractive index difference Δ of the core 11 to the clad 20 is 0.47% and the radius $r_1$ of the core 11 is 6.12 μm.

Figure 11:
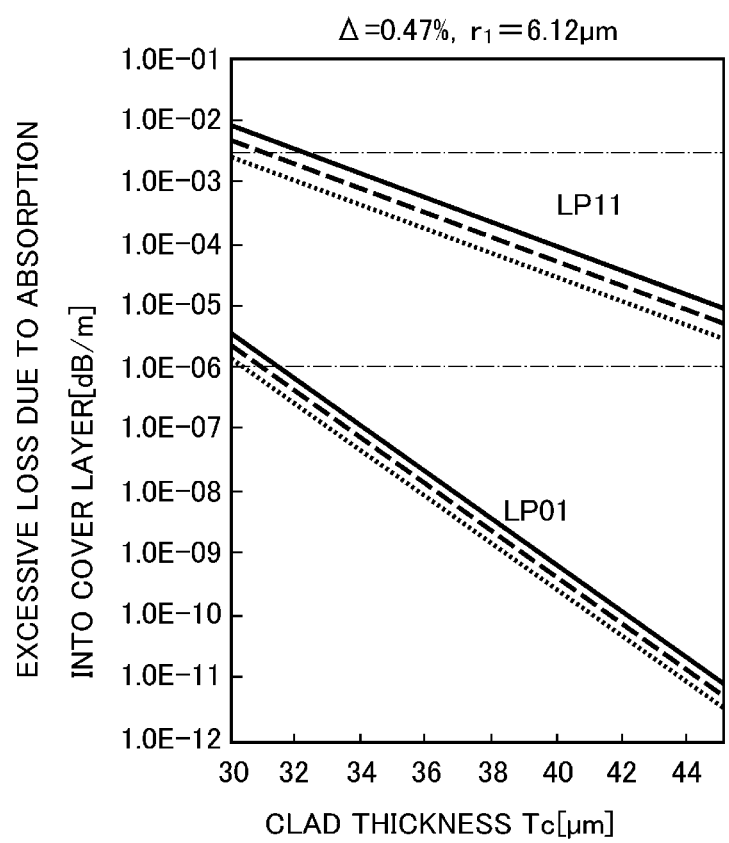
FIG. 11 is a diagram according to one or more embodiments illustrating a calculation result of a relation of a clad thickness and an excessive loss of light due to absorption into the cover layer, when a relative refractive index difference of the core to the clad is 0.47% and a radius of the core is 6.12 μm.

In calculations of FIGS. 9 to 11, similarly to the first example of one or more embodiments, a wavelength of the light of the LP01 mode is set to 1625 nm and a wavelength of the light of the LP11 mode is set to 1530 nm. In addition, in the calculations of FIGS. 9 to 12, a bending radius of the multicore fiber is set to 140 mm, from the same reason as the first example of one or more embodiments.

As illustrated in FIGS. 9 to 11, even in the second example of one or more embodiments, in the light of the LP01 mode, an excessive loss due to absorption into the cover layer 30 becomes 0.001 dB/km or less in a region where the clad thickness Tc is roughly 31 μm and in the light of the LP11 mode, an excessive loss due to absorption into the cover layer 30 becomes 3 dB/km or more in a region where the clad thickness Tc is roughly 31 μm. Therefore, it is seen that there is an example in which the excessive loss of the light of the LP01 mode due to absorption into the cover layer 30 is 0.001 dB/km or less and the excessive loss of the light of the LP11 mode due to absorption into the cover layer 30 is 3 dB/km or more, in the region where the clad thickness Tc is roughly 31 μm. In the calculations of FIGS. 9 to 11, in a C band and an L band, a wavelength of the light of the LP01 mode is a wavelength where the effective area $A_{eff}$ is largest and a wavelength of the light of the LP11 mode is a wavelength where the effective area $A_{eff}$ is smallest. Therefore, there is a combination of the clad thickness Tc and the radius $r_1$ of the core 11 in which the light of the LP01 mode can be propagated at the excessive loss due to absorption into the small cover layer 30 not interfering with optical communication and the light of the LP11 mode unnecessary for communication can be sufficiently attenuated.

Therefore, similarly to the multicore fiber 1 according to the first example of one or more embodiments in which the light is propagated through the core 11 disposed on the outermost side, with respect to the clad thickness Tc of the multicore fiber 2 according to the second example of one or more embodiments, a distance between the core 11 disposed on the outermost side in the clad 20 and the cover layer 30 is set to a distance at which the excessive loss of the light of the LP01 mode, propagated through the core 11 disposed on the outermost side, due to absorption into the cover layer 30, becomes 0.001 dB/km or less and the excessive loss of the light of the LP11 mode, propagated through the core 11 disposed on the outermost side, due to absorption into the cover layer 30, becomes 3 dB/km or more.

Next, a relation of a core pitch and crosstalk according to the second example of one or more embodiments will be described.

Figure 12:
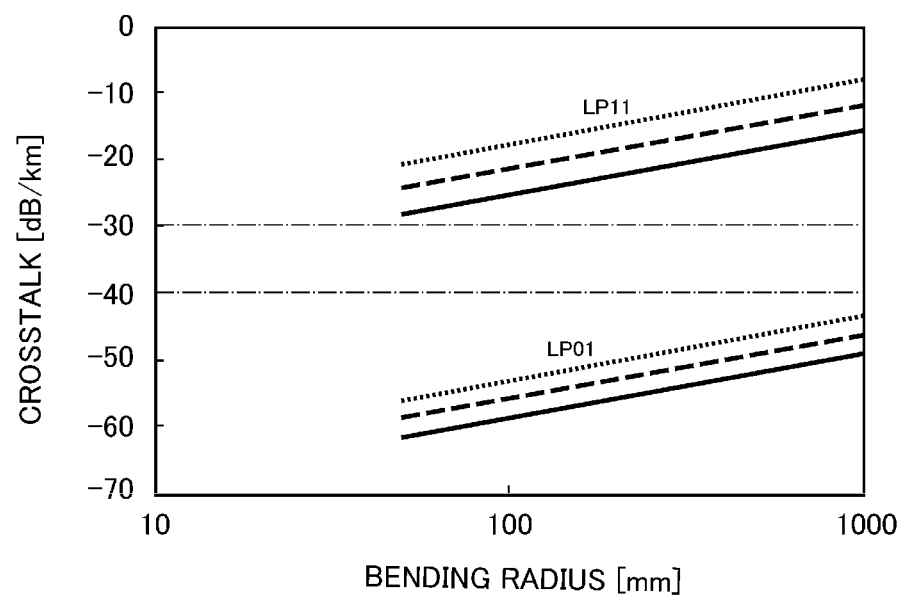
FIG. 12 is a diagram according to one or more embodiments illustrating a calculation result of a relation of a bending diameter of the multicore fiber and crosstalk.

FIG. 12 is a diagram illustrating a calculation result of a relation of a bending radius of the multicore fiber 2 according to the second example of one or more embodiments and the crosstalk. In the multicore fiber 1 having the 31 core elements illustrated in FIG. 7, similarly to the first example of one or more embodiments, a core pitch Λ is set to 32 μm and a wavelength of the light of the LP01 mode and a wavelength of the light of the LP11 mode are set to the wavelengths used in the calculations of FIGS. 9 to 11. In FIG. 12, a solid line shows a result in which a relative refractive index difference Δ of the core 11 to the clad 20 and the radius of the core 11, used in the calculation of FIG. 9, are used and a ratio $W/r_1$ of a radius $r_1$ of the core 11 and a thickness W of the low refractive index layer 13 is calculated as 0.9. In addition, a broken line shows a result in which the relative refractive index difference Δ of the core 11 to the clad 20 and the radius of the core 11, used in the calculation of FIG. 10, are used and the ratio $W/r_1$ of the radius $r_1$ of the core 11 and the thickness W of the low refractive index layer 13 is calculated as 0.8. In addition, a dotted line shows a result in which the relative refractive index difference Δ of the core 11 to the clad 20 and the radius of the core 11, used in the calculation of FIG. 11, are used and the ratio $W/r_1$ of the radius $r_1$ of the core 11 and the thickness W of the low refractive index layer 13 is calculated as 0.7.

As illustrated in FIG. 12, even in the second example of one or more embodiments, a result in which the crosstalk of the light of the LP01 mode is smaller than −40 dB/km in all cases is obtained and a result in which the crosstalk of the light of the LP11 mode is larger than −30 dB/km in all cases is obtained. That is, in the case of the above conditions, if the core pitch is 32 μm, the crosstalk of the light of the LP01 mode can be set to −40 dB/km or less and the crosstalk of the light of the LP11 mode can be set to −30 dB/km or more. In FIG. 12, in the C band and the L band, the wavelength of the light of the LP01 mode is calculated as a wavelength where an effective area $A_{eff}$ is largest and the wavelength of the light of the LP11 mode is calculated as a wavelength where the effective area $A_{eff}$ is smallest. Therefore, similar to the first example of one or more embodiments, in the second example of one or more embodiments, there is the core pitch Λ where the crosstalk of the light of the LP01 mode can be set to a small value not interfering with the optical communication and the crosstalk of the light of the LP11 mode can be set to a large value, when the light of the LP01 mode and the light of the LP11 mode are propagated in the same wavelength band.

Therefore, the core pitch Λ of the multicore fiber 2 according to the second example of one or more embodiment is set to a distance at which the crosstalk of the light of the LP01 mode (primary LP mode) becomes −40 dB/km or less and the crosstalk of the light of the LP11 mode (secondary LP mode) becomes −30 dB/km or more.

Even in the multicore fiber 2 according to the second example of one or more embodiment, from the same reason as the multicore fiber 1 according to the first example of one or more embodiments, the crosstalk of the LP01 mode can be improved while the propagation of the light of the LP11 mode is suppressed.

Next, a third example of one or more embodiments of the present invention will be described in detail with reference to FIGS. 13 to 15. Components equal to or equivalent to those in the first example of one or more embodiments are denoted with the same reference numerals and overlapped description is omitted except for the case in which description is given particularly.

Figure 13:
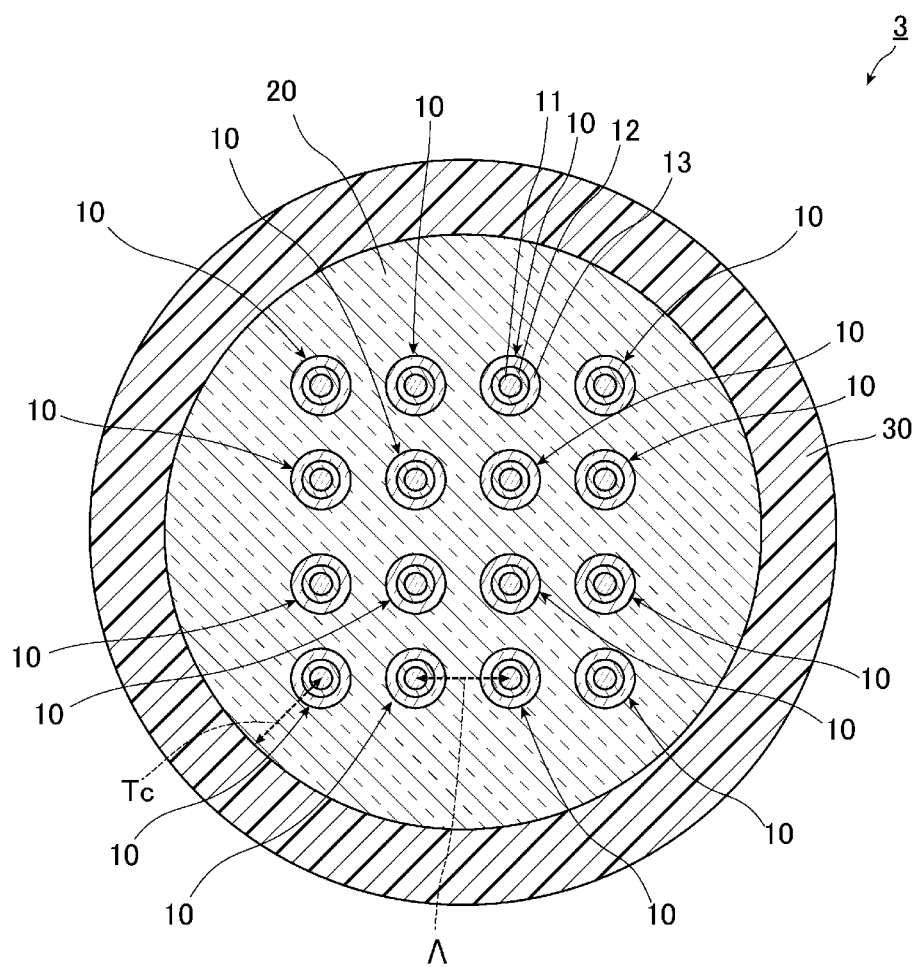
FIG. 13 is a cross-sectional view of a multicore fiber according to a third example of one or more embodiments of the present invention, vertical to a longitudinal direction.

FIG. 13 is a diagram illustrating an aspect of a multicore fiber according to the third example of one or more embodiments. As illustrated in FIG. 13, in a multicore fiber 3 according to the third example of one or more embodiments, each core element 10 has the same configuration as the configuration of the core element 10 in the multicore fiber 1 according to the first example of one or more embodiments. Therefore, even in the third example of one or more embodiments, each core element 10 is configured to propagate light of an LP01 mode and light of an LP11 mode. In the multicore fiber 1 according to the first example of one or more embodiments, because the individual core elements 10 are disposed in a closest packing state, a line connecting individual cores 11 becomes a triangular lattice. However, in the multicore fiber 3 according to the third example of one or more embodiment, a line connecting the individual cores 11 becomes a square lattice.

In a clad 20 of the multicore fiber 3 according to the third example of one or more embodiment, a distance between each of the four cores 11 disposed on an outermost side in the clad 20 and a cover layer 30 is set to a distance at which an excessive loss of the light of the LP01 mode (primary LP mode), propagated through the cores 11 disposed on the outermost side, due to absorption into the cover layer 30, becomes 0.001 dB/km or less and an excessive loss of the light of the LP11 mode (secondary LP mode), propagated through the cores 11 disposed on the outermost side, due to absorption into the cover layer 30, becomes 3 dB/km or more. Similarly to the multicore fiber 1 according to the first example or one or more embodiments, a core pitch Λ of the multicore fiber 3 according to the third example of one or more embodiments is set to a distance at which the crosstalk of the light of the LP01 mode becomes −40 dB/km or less and the crosstalk of the light of the LP11 mode becomes −30 dB/km or more. For example, the core pitch Λ of the multicore fiber 3 is set to 31.8 μm, a clad thickness Tc is set to 31 µm, and a diameter of the clad 20 is set to 197 µm. In the third example of one or more embodiments, a distance from a center of each of the four cores 11 disposed on the outermost side to an outer circumferential surface of the clad 20 becomes a clad thickness.

Therefore, even in the multicore fiber 3 according to the third example of one or more embodiments, from the same reason as the multicore fiber 1 according to the first example of one or more embodiments, the crosstalk of the LP01 mode can be improved while the propagation of the light of the LP11 mode is suppressed.

Figure 14:
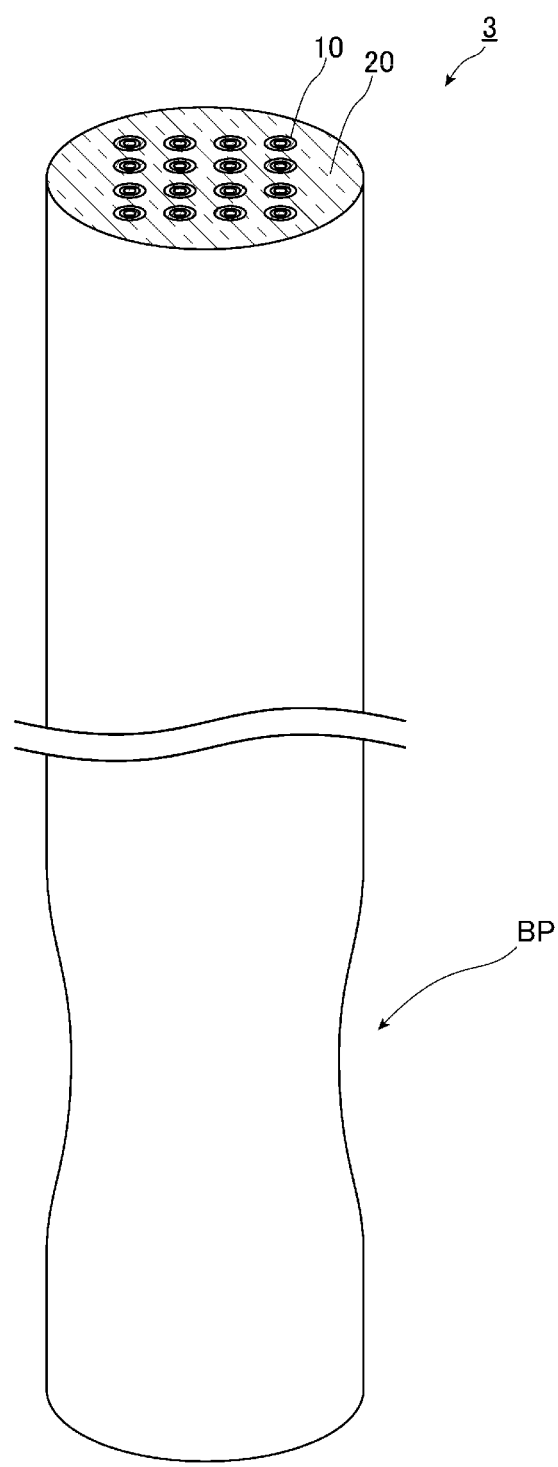
FIG. 14 is a side view of the multicore fiber of FIG. 13 according to one or more embodiments.

FIG. 14 is a side view of the multicore fiber 3 of FIG. 13. However, in FIG. 14, the cover layer 30 is omitted to facilitate understanding. As illustrated in FIG. 14, the multicore fiber 3 according to the third example of one or more embodiments further includes an extension portion BP that extends such that diameters of the plurality of cores 11 decrease, in a part of the plurality of cores 11 in a longitudinal direction. The extension portion BP is extended by partially removing the cover layer 30 of the multicore fiber 3, heating the multicore fiber 3 from the outside of the clad 20, and drawing the multicore fiber 3.

Figure 15:
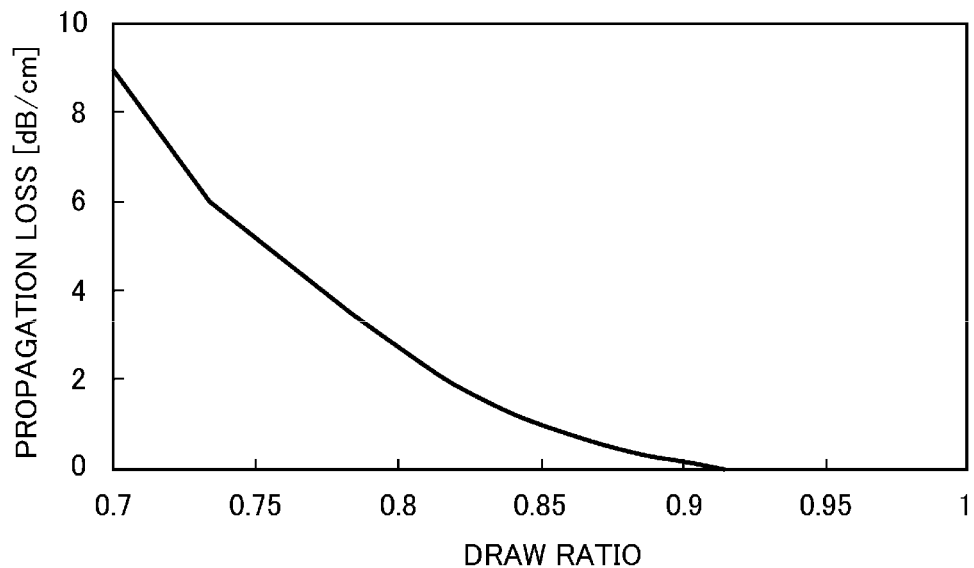
FIG. 15 is a diagram according to one or more embodiments illustrating a calculation result of a relation of a draw ratio and a propagation loss of light of an LP11 mode.

FIG. 15 is a diagram illustrating a calculation result of a relation of a draw ratio and a propagation loss of the light of the LP11 mode. When the calculation of FIG. 15 is performed, a relative refractive index difference $\Delta_r$ of a low refractive index layer 13 to the clad 20 is set to −0.7%, a ratio $r_2/r_1$ of a radius $r_1$ of the core 11 and a radius $r_2$ of an inner clad 12 is set to 1.7, a relative refractive index difference $\Delta$ of the core 11 to the clad 20 is set to 0.45%, the radius of the core 11 is set to 5.17 µm, and a ratio $W/r_1$ of the radius $r_1$ of the core 11 and a thickness W of the low refractive index layer 13 is set to 0.9. From FIG. 15, if a diameter reduction ratio of the extension portion BP to a non-extension portion is set to about 0.6, that is, a diameter of each member of the multicore fiber 3 in the extension portion BP is set to 0.6 times as large as a diameter of each member of the multicore fiber 3 in the diameter non-reduction portion, it can be anticipated that a loss of the light of the LP11 mode propagated through the core element 10 becomes 10 dB/cm. Therefore, the extension portion BP of the diameter reduction ratio of about 0.6 is provided by about 2 cm, so that the light of the LP11 mode can be eliminated not to obstruct optical communication. In this case, in the LP01 mode to be a basic mode, a loss of light due to extension is little as 0.001 dB or less and rarely affects the optical communication.

According to the third example of one or more embodiments, the light of the LP11 mode can be eliminated by the cover layer 30, the extension portion BP is provided, so that the light of the LP11 mode can be caused to be further lost, and light of a mode unnecessary for communication can be eliminated more appropriately.

The present invention has been described using the above embodiments as the examples. However, the present invention is not limited thereto.

For example, even in the multicore fiber 1 according to the first example of one or more embodiments and the multicore fiber 2 according to the second example of one or more embodiments, the extension portion BP provided in the multicore fiber 3 according to the third example of one or more embodiments may be provided. In this case, in the multicore fibers 1 and 2, the light of the LP11 mode can be caused to be further lost and the light of the mode unnecessary for the communication can be eliminated more appropriately.

Figure 16:
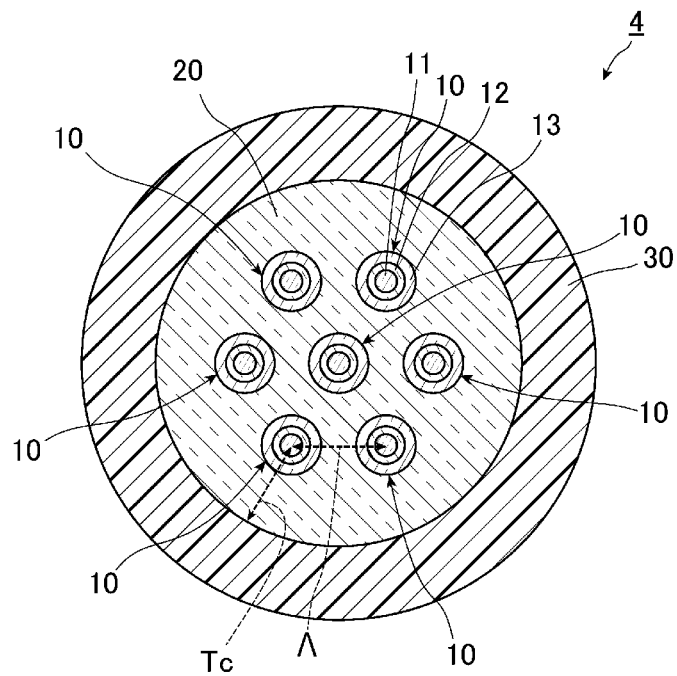
FIG. 16 is a cross-sectional view of a multicore fiber according to one or more embodiments of the present invention, vertical to a longitudinal direction.

In addition, in the first and second examples of one or more embodiments, the 31 core elements 10 are disposed in a closest packing state and in the third example of one or more embodiments, the 16 core elements 10 are disposed in a square lattice shape. However, the number of cores in the multicore fiber according to one or more embodiments of the present invention is not limited to the above number, as long as the number is plural. FIG. 16 is a cross-sectional view of a multicore fiber according to one or more embodiments of the present invention. In describing this modification, components equal to or equivalent to those in the first example of one or more embodiments are denoted with the same reference numerals and overlapped description is omitted except for the case in which description is given particularly. As illustrated in FIG. 16, a multicore fiber 4 according to this modification is different from the multicore fiber 1 according to the first example of one or more embodiments in that one core element is disposed as a core element of a first layer at a center of a clad 20, a plurality of core elements 10 are disposed as core elements of a second layer on an outer circumferential side of the core element 10 of the first layer, and no core element is disposed on outer circumferential sides of the core elements 10 of the second layer. Even in the multicore fiber of the 1-6 arrangement, the core element 10 is equal to the core element 10 of the multicore fiber 1 according to the first example of one or more embodiments, the core pitch Λ is equal to the core pitch Λ of the multicore fiber 1 according to the first example of one or more embodiments, and a clad thickness Tc is equal to the clad thickness Tc of the multicore fiber 1 according to the first example of one or more embodiments. As a result, from the same reason as the multicore fiber 1 according to the first example of one or more embodiments, the crosstalk of the LP01 mode can be improved while the propagation of the light of the LP11 mode is suppressed.

In addition, in one or more embodiments, the multicore fiber 1 is configured such that the single mode communication is performed using the light of the LP01 mode in the communication band, each core 11 propagates the light of the LP01 mode and the light of the LP11 mode, and the light of the LP11 mode is eliminated. However, the present invention is not limited thereto. That is, one or more embodiments of the present invention can be used in the case in which few-mode communication or multi-mode communication is performed and each core may be configured to propagate light up to a higher-order mode by a 1 LP mode as compared with a mode used for communication and the light of the higher-order mode by the 1 LP mode may be eliminated by the cover layer. Specifically, the multicore fiber according to one or more embodiments of the present invention is a multicore fiber for performing communication using light up to an xth-order LP mode (where x is an integer of 1 or more) in a communication band. Each of the plurality of cores 11 propagates light up to an (x+1)th-order LP mode. The core pitch Λ is set to a distance at which crosstalk of the light up to the xth-order LP mode becomes −40 dB/km or less and crosstalk of light of the (x+1)th-order LP mode becomes −30 dB/km or more. The distance between the core 11 disposed on the outermost side in the clad 20 and the cover layer 30 is set to a distance at which an excessive loss of the light up to the xth-order LP mode, propagated through the core disposed on the outermost side, due to absorption into the cover layer becomes 0.001 dB/km or less and an excessive loss of the light of the (x+1)th-order LP mode, propagated through the core disposed on the outermost side, due to absorption into the cover layer becomes 3 dB/km or more.

According to the multicore fiber, because each core 11 is the core propagating the light of the higher-order mode by the 1 mode as compared with the core propagating the light up to the xth-order LP mode, confinement of the light up to the xth-order LP mode in the core is intensified and the crosstalk is improved. Meanwhile, an effective area of the light up to the (x+1)th-order LP mode is larger than an effective area of the light of the xth-order LP mode. By using this, the distance between the core 11 disposed on the outermost side in the clad 20 and the cover layer can be set to a distance at which the excessive loss of the light up to the xth-order LP mode, propagated through the core disposed on the outermost side, due to absorption into the cover layer becomes 0.001 dB/km or less and the excessive loss of the light of the (x+1)th-order LP mode, propagated through the core disposed on the outermost side, due to absorption into the cover layer becomes 3 dB/km or more. Therefore, the light of the (x+1)th-order LP mode that is propagated through the core 11 located at the outermost side in the clad 20 and is unnecessary for the communication is absorbed into the cover layer 30 and is lost. By using a fact that the effective area of the light up to the (x+1)th-order LP mode is larger than the effective area of the light of the xth-order LP mode, the core pitch Λ can be set to the distance at which the crosstalk of the light up to the xth-order LP mode becomes −40 dB/km or less and the crosstalk of the light of the (x+1)th-order LP mode becomes −30 dB/km or more. Therefore, the crosstalk of the light up to the xth-order LP mode used for the communication is suppressed and the crosstalk of the light of the (x+1)th-order LP mode to be light unnecessary for the communication occurs. As a result, the light of the (x+1)th-order LP mode can be moved to the core 11 located at the outermost side in the clad 20 by the crosstalk and is absorbed into the cover layer 30 as described above. In this way, the light up to the xth-order LP mode is propagated and the crosstalk of the light up to the xth-order mode is improved.

As such, even when the multicore fiber performs the communication using the light up to the xth-order LP mode in the communication band, the extension portion BP according to the third example of one or more embodiments is provided. In this case, in the extension portion BP, the loss of the light of the (x+1)th-order LP mode is 20 dB or more and the excessive loss of the light of the xth-order LP mode is 0.001 dB or less.

In addition, in one or more embodiments, each core 11 is configured to be surrounded by the low refractive index layer 13. However, the present invention is not limited thereto. For example, each core 11 may be surrounded by the clad 20 directly. Even in this case, design is enabled, in which each of the plurality of cores 11 propagates the light up to the (x+1)th-order LP mode, the core pitch Λ is set to the distance at which the crosstalk of the light up to the xth-order LP mode becomes −40 dB/km or less and the crosstalk of the light of the (x+1)th-order LP mode becomes −30 dB/km or more, and the distance between the core 11 disposed on the outermost side in the clad 20 and the cover layer 30 can be set to the distance at which the excessive loss of the light up to the xth-order LP mode, propagated through the core 11 disposed on the outermost side, due to absorption into the cover layer 30 becomes 0.001 dB/km or less and the excessive loss of the light of the (x+1)th-order LP mode, propagated through the core 11 disposed on the outermost side, due to absorption into the cover layer 30 becomes 3 dB/km or more.

EXAMPLES

Hereinafter, contents of the present invention will be described more specifically using examples and comparative examples. However, the present invention is not limited thereto.

The multicore fiber 1 according to the first example of one or more embodiments was manufactured. An average value of the core pitch Λ of the manufactured multicore fiber 1 became 31.6 μm, an average value of the clad thickness Tc became 31.5 μm, an average value of the clad diameter became 231.0 μm, and an average value of an outer diameter of the cover layer 30 became 334.8 μm. In addition, a length was 11.2 km. The propagation loss of the light of the LP01 mode propagated through the multicore fiber 1 was measured. In addition, polarization mode dispersion PMD, a polarization loss difference PDL, an effective area $A_{\mathit{eff}}$, and a cable cutoff wavelength λc were measured. Results thereof are shown in Table 3. In Table 3, the cores 1 to 12 show the cores of the fourth layer in the first example of one or more embodiments, the cores 13 to 24 show the cores of the third layer in the first example of one or more embodiments, the cores 25 to 30 show the cores of the second layer in the first example of one or more embodiments, and the core 31 shows the core of the first layer in the first example of one or more embodiments.

TABLE 3

| Core | Propagation loss [dB/km] $LP_{01}$ | | PMD [ps/√km] 1530-1625 nm | PDL [dB] | $A_{\mathit{eff}}$ [μm²] | | $λ_{cc}$ [μm] |
|---|---|---|---|---|---|---|---|
| | 1550 nm | 1625 nm | | | 1550 nm | 1625 nm | |
| 1 | 0.294 | 0.3 | 0.12 | 0.08 | 76.1 | 79.6 | 1.71 |
| 2 | 0.293 | 0.292 | | | | | |
| 3 | 0.277 | 0.289 | | | | | 1.66 |
| 4 | 0.279 | 0.294 | | | | | |
| 5 | 0.282 | 0.291 | | | 75.2 | 79.4 | 1.66 |
| 6 | 0.281 | 0.289 | | | | | 1.69 |
| 7 | 0.291 | 0.298 | 0.11 | 0.09 | | | 1.68 |
| 8 | 0.293 | 0.298 | | | | | |
| 9 | 0.282 | 0.292 | | | | | 1.7 |
| 10 | 0.286 | 0.286 | 0.1 | 0.08 | | | 1.7 |
| 11 | 0.285 | 0.282 | | | 74.7 | 79.7 | 1.67 |
| 12 | 0.29 | 0.299 | | | | | |
| 13 | 0.283 | 0.293 | 0.26 | 0.11 | 74.3 | 80.8 | 1.75 |
| 14 | 0.264 | 0.275 | | | | | |
| 15 | 0.277 | 0.289 | | | 74 | 78.9 | |
| 16 | 0.256 | 0.269 | 0.15 | 0.06 | | | 2.02 |
| 17 | 0.277 | 0.289 | | | | | |
| 18 | 0.272 | 0.282 | | | | | |
| 19 | 0.293 | 0.298 | 0.27 | 0.06 | 74.9 | 80.4 | 1.71 |
| 20 | 0.286 | 0.294 | | | | | |
| 21 | 0.286 | 0.292 | | | | | 1.77 |
| 22 | 0.271 | 0.273 | 0.19 | 0.07 | | | 2.04 |
| 23 | 0.293 | 0.297 | | | | | |
| 24 | 0.274 | 0.274 | | | | | 2.03 |
| 25 | 0.26 | 0.264 | 0.07 | 0.07 | 74.3 | 80.8 | 1.99 |
| 26 | 0.274 | 0.27 | | | | | |
| 27 | 0.287 | 0.294 | | | | | 2.04 |
| 28 | 0.261 | 0.266 | 0.14 | 0.07 | 75.7 | 78.4 | |
| 29 | 0.253 | 0.268 | 0.12 | 0.08 | | | 2.05 |
| 30 | 0.25 | 0.265 | | | | | |
| 31 | 0.245 | 0.257 | 0.1 | 0.04 | 75 | 78.2 | 2.04 |

Losses other than the excessive loss due to absorption into the cover layer are included in the loss of the light propagated through the cores. For this reason, from Table 3, it is thought that the excessive loss of the light of the LP01 mode, propagated through the cores 1 to 12, due to absorption into the cover layer becomes 0.001 dB/km or less.

Next, the crosstalk of the cores 11 adjacent to each other was measured. The measurement of the crosstalk of the light of the LP01 mode was performed by calculating the crosstalk from wavelength dependency of the crosstalk of the light of the LP01 mode in a band of a cutoff wavelength or more. In addition, the measurement of the crosstalk of the light of the LP11 mode was performed by converting light from a wavelength variable light source into the light of the LP11 mode by a mode converter, causing the light to be incident on the specific core, connecting a 2-mode optical fiber to the measured core adjacent to the core, receiving light emitted from the 2-mode optical fiber, and calculating the crosstalk. Results thereof are shown in Table 4. The cores described in a first column of Table 4 and the cores described in a second column thereof are cores adjacent to each other.

TABLE 4

| | | 11.2 km (Measured XT) | |
|---|---|---|---|
| Excited core | Measured core | $XT_{11\text{-}11}$ | $XT_{01\text{-}01}$ |
| 8 | 9 | −5.6 | −38.5 |
| | 19 | −8.2 | −38.8 |
| | 20 | −7.7 | −38.8 |
| 17 | 5 | −8.7 | −41 |
| | 6 | −5.8 | −39.5 |
| | 16 | −8.1 | −37.5 |
| | 27 | −6.4 | −37.8 |
| 22 | 10 | −6 | −39.8 |
| | 23 | −2.4 | −38.1 |
| | 29 | −4.6 | −39.5 |
| 26 | 14 | −5.7 | −39.1 |
| | 15 | −4.9 | −39.8 |
| | 25 | −5.3 | −38.1 |
| | 31 | −4.1 | −36.3 |
| 31 | 25 | −3.8 | −37.8 |
| | 27 | −3.7 | −36.7 |
| | 29 | −3 | −34.7 |
| Average | | −5.5 | −38.4 |
| Maximum | | −2.4 | −34.7 |
| Minimum | | −8.7 | −41 |

As shown in Table 4, a result in which the crosstalk of the light of the LP11 mode is larger than the crosstalk of the light of the LP01 mode or the crosstalk of the light of the LP01 mode and the light of the LP11 mode and the light of the LP11 mode can be moved to the outermost core by the crosstalk while the crosstalk of the LP01 mode is suppressed was obtained.

Second Example

The multicore fiber 2 according to the second example of one or more embodiments was manufactured. An average value of the core pitch Λ of the manufactured multicore fiber 2 became 32.1 μm, an average value of the clad thickness Tc became 31.2 μm, an average value of the clad diameter became 230.8 μm, and an average value of an outer diameter of the cover layer 30 became 337.0 μm. In addition, a length was 10.5 km. Similarly to the first example, with respect to the multicore fiber 1, the crosstalk of the cores 11 adjacent to each other was measured. Results thereof are shown in Table 5. The cores described in a first column of Table 5 and the cores described in a second column thereof are cores adjacent to each other.

TABLE 5

| | | 10.5 km (Measured XT) | |
|---|---|---|---|
| Excited core | Measured core | $XT_{11\text{-}11}$ | $XT_{01\text{-}01}$ |
| 8 | 9 | −9.2 | −43 |
| | 19 | −11.8 | −43.3 |
| | 20 | −11.3 | −43.3 |
| 17 | 5 | −12.3 | −45.5 |
| | 6 | −9.4 | −44 |
| | 16 | −11.7 | −42 |
| | 27 | −10 | −42.3 |
| 22 | 10 | −9.6 | −44.3 |
| | 23 | −6 | −42.6 |
| | 29 | −8.2 | −44 |
| 26 | 14 | −9.3 | −43.6 |
| | 15 | −8.5 | −44.3 |
| | 25 | −8.9 | −42.6 |
| | 31 | −7.7 | −40.8 |
| 31 | 25 | −7.4 | −42.3 |
| | 27 | −7.3 | −41.2 |
| | 29 | −6.6 | −39.2 |

As shown in Table 5, a result in which the crosstalk of the light of the LP11 mode is larger than the crosstalk of the light of the LP01 mode or the crosstalk of the light of the LP01 mode and the light of the LP11 mode and the light of the LP11 mode can be moved to the outermost core by the crosstalk while the crosstalk of the LP01 mode is suppressed was obtained.

Third Example

The multicore fiber 4 according to the modification was manufactured. An average value of the core pitch Λ of the manufactured multicore fiber 4 became 32.4 μm, an average value of the clad thickness Tc became 29.9 μm, an average value of the clad diameter became 124.4 μm, and an average value of an outer diameter of the cover layer 30 became 220.0 μm. In addition, a length was 10.0 km. Similarly to the first example, with respect to the multicore fiber 4, propagation losses of the light of the LP01 mode and the light of the LP11 mode, polarization mode dispersion PMD, a polarization loss difference PDL, an effective area $A_{eff}$, and a cable cutoff wavelength λc were measured. Results thereof are shown in Table 6. In Table 6, the cores 1 to 6 show the cores disposed on the outer circumferential side and the core 7 shows the core disposed on the center of the clad.

TABLE 6

| | Propagation loss [dB/km] $LP_{01}$ | | PMD [ps/√km] | PDL [dB] | $A_{eff}$ [μm²] | | $\lambda_{cc}$ [μm] |
|---|---|---|---|---|---|---|---|
| Core | 1550 nm | 1625 nm | 1530-1625 nm | | 1550 nm | 1625 nm | — |
| 1 | 0.226 | 0.24 | | | 76.1 | 79.6 | 1.66 |
| 2 | 0.229 | 0.238 | | | | | |
| 3 | 0.245 | 0.256 | | | | | 1.69 |
| 4 | 0.23 | 0.238 | 0.177 | 0.15 | | | |
| 5 | 0.225 | 0.233 | | | 75.2 | 79.4 | 1.69 |
| 6 | 0.227 | 0.237 | | | | | 1.69 |
| 7 | 0.225 | 0.234 | 0.201 | 0.1 | | | 2.1 |

From Table 6, it is thought that the excessive loss of the light of the LP01 mode, propagated through the cores to 6, due to absorption into the cover layer becomes 0.001 dB/km or less.

From the results of the examples described above, it was confirmed that the crosstalk of the light of the LP01 mode is suppressed and the crosstalk of the light of the LP11 mode occurs, according to the multicore fiber according to one or more embodiments of the present invention. In addition, in the examples, it is thought that the excessive loss of the light, propagated through the core disposed on the outermost side, due to absorption into the cover layer becomes 0.001 dB/km or less, from the propagation loss of the light of the LP01 mode, and it is thought that the excessive loss of the light, propagated through the core disposed on the outermost side, due to absorption into the cover layer becomes 3 dB/km or more, when the propagation loss of the light of the LP01 mode is measured.

As described above, according to one or more embodiments of the present invention, a multicore fiber capable of improving a degree of freedom for design can be provided and the multicore fiber can be used in a field of optical communication.

REFERENCE SIGNS LIST 1 to 4 . . . multicore fiber
10 . . . core element
11 . . . core
12 . . . inner clad
13 . . . low refractive index layer
20 . . . clad
30 . . . cover layer
BP . . . extension portion
Tc . . . clad thickness
$\Lambda$ . . . core pitch Although the disclosure has been described with respect to only a limited number of embodiments, those skilled in the art, having benefit of this disclosure, will appreciate that various other embodiments may be devised without departing from the scope of the invention. Accordingly, the scope of the invention should be limited only by the attached claims.

The invention claimed is:

1. A multicore fiber that communicates using light up to an xth-order LP mode (where x is an integer of 1 or more) in a communication band, the multicore fiber comprising:
   a plurality of cores;
   a clad that surrounds the plurality of cores and has a refractive index lower than refractive indexes of the plurality of cores; and
   a cover layer that covers the clad and has a refractive index higher than the refractive index of the clad,
   wherein
   each of the plurality of cores propagates light up to an (x+1)th-order LP mode,
   a core pitch is set to a distance where crosstalk of the light up to the xth-order LP mode becomes less than or equal to −40 dB/km and crosstalk of light of the (x+1)th-order LP mode becomes greater than or equal to −30 dB/km, and
   a distance between the core disposed on an outermost side in the clad and the cover layer is set to a distance where an excessive loss of the light up to the xth-order LP mode, propagated through the core disposed on the outermost side, due to absorption into the cover layer becomes less than or equal to 0.001 dB/km and an excessive loss of the light of the (x+1)th-order LP mode, propagated through the core disposed on the outermost side, due to absorption into the cover layer becomes greater than or equal to 3 dB/km.

2. The multicore fiber according to claim 1, further comprising:
   an extension portion that extends such that diameters of the plurality of cores, in a part of the plurality of cores, decreases in a longitudinal direction,
   wherein, in the extension portion, the plurality of cores propagate the light up to the xth-order LP mode and propagation of the light of the (x+1)th-order LP mode is suppressed.

3. The multicore fiber according to claim 2, wherein, in the extension portion, a loss of the light of the (x+1)th-order LP mode is greater than or equal to 20 dB.

4. The multicore fiber according to claim 1, wherein x is 1.

* * * * *